US012467250B2

(12) United States Patent
Conybeare

(10) Patent No.: US 12,467,250 B2
(45) Date of Patent: Nov. 11, 2025

(54) STUD FRAME CONNECTOR

(71) Applicant: STUD CONNECTOR (IP) LIMITED, London (GB)

(72) Inventor: Nigel Paul Conybeare, Tring (GB)

(73) Assignee: Stud Connector (IP) Limited, London (GB)

( * ) Notice: Subject to any disclaimer, the term of this patent is extended or adjusted under 35 U.S.C. 154(b) by 295 days.

(21) Appl. No.: 18/043,937

(22) PCT Filed: Sep. 7, 2021

(86) PCT No.: PCT/GB2021/052294
§ 371 (c)(1),
(2) Date: Mar. 3, 2023

(87) PCT Pub. No.: WO2022/049397
PCT Pub. Date: Mar. 10, 2022

(65) Prior Publication Data
US 2024/0018773 A1      Jan. 18, 2024

(30) Foreign Application Priority Data
Sep. 7, 2020   (GB) ...................................... 2014002

(51) Int. Cl.
  *E04B 1/58*  (2006.01)
  *E04B 1/38*  (2006.01)
(52) U.S. Cl.
  CPC ............ *E04B 1/5818* (2013.01); *E04B 1/388* (2023.08)
(58) Field of Classification Search
  CPC ............................... E04B 1/5818; E04B 2/767
  See application file for complete search history.

(56) References Cited

U.S. PATENT DOCUMENTS

| 2005/0166497 A1* | 8/2005 | Emiliani ................. E04F 19/08 |
| | | 52/220.1 |
| 2010/0186346 A1* | 7/2010 | Bratton ..................... E04C 3/28 |
| | | 403/205 |
| 2016/0333579 A1 | 11/2016 | Stein |

FOREIGN PATENT DOCUMENTS

| GB | 2521837 A * | 7/2015 | ........... E04B 1/2403 |
| WO | 2017001136 A1 | 1/2017 | |

OTHER PUBLICATIONS

International Search Report and Written Opinion from corresponding PCT Appln. No. PCT/GB2021/052294, dated Jan. 7, 2022. 15 pages.

(Continued)

*Primary Examiner* — Joshua K Ihezie
(74) *Attorney, Agent, or Firm* — Grossman, Tucker, Perreault & Pfleger, PLLC; Donald J. Perreault

(57) ABSTRACT

A connector for connecting two stud members in a stud wall comprises a block element made from a polymeric material, the block element comprising a main body portion configured for insertion into an end of a first stud member, the main body portion comprising four substantially orthogonal side walls, an engagement slot being provided in a first one of the side walls and the engagement slot extending in a direction towards an opposite second one of the side walls; an attachment portion extending from the main body portion, the attachment portion including a pair of locking wings configured to engage with a second stud member such that, in use, a part of the second stud member is disposed in gaps between the locking wings and the main body portion; and a plate slot extending through a part of the attachment portion and through a part of the main body portion. The connector further comprising a plate element made from a metallic material, the plate element comprising first and second side edges and a notch in each of the first and second (Continued)

side edges, the plate element being disposed in the plate slot of the block element such that the notches of the plate element are aligned with the gaps in the block element.

21 Claims, 10 Drawing Sheets

(56) References Cited

OTHER PUBLICATIONS

Search Report under Section 17(5) of United Kingdom Patent Application No. GB2014002.6, dated Jan. 25, 2021. 3 pages.

* cited by examiner

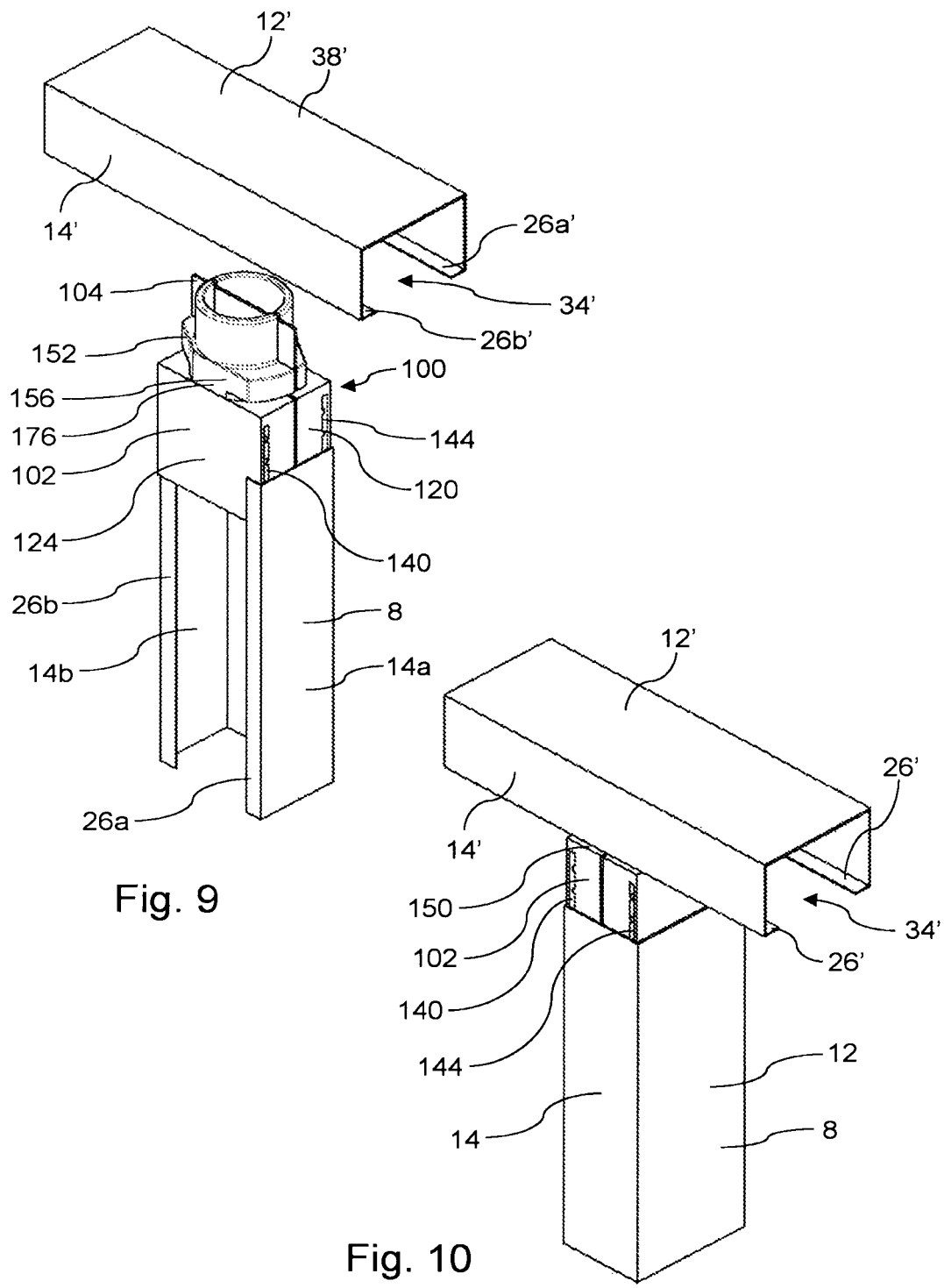

STUD FRAME CONNECTOR

FIELD OF THE INVENTION

The present invention relates to building elements and in particular building elements used to construct stud frames for forming internal walls of a building. The invention relates to connectors that may be used to connect two substantially perpendicular stud members. The present invention also relates to stud frames including such building elements or connectors, to walls including a stud frame, to a kit including a building element or connector and stud frame members, and to a method of constructing a stud frame.

BACKGROUND TO THE INVENTION

Internal walls of a building may comprise a supporting frame made from streel studs and sheets of plasterboard that are attached to and cover the supporting frame. Vertical steel studs extend substantially vertically between a floor and a ceiling of the building, and horizontal steel studs may extend between and be connected to adjacent vertical studs.

It is generally known that external forces applied to a building, such as due to wind loading for example, causes movement of internal walls relative to other parts of the structure of the building. Both vertical and horizontal forces may be applied to internal walls due to deflection and movement of other parts of the building's structure.

A current method of fixing vertical steel studs in an internal wall is to provide an over depth head track which is fitted to a deflection head. A deflection head comprises two pieces of plasterboard which are fixed to the ceiling soffit or underside of the ceiling. This provides a fire break. A base track is fitted to the floor. Vertical studs are cut to a length such that they fit and extend between the head track and the base track. The vertical studs have to be accurately cut so that they fit between the head track and base track leaving a gap within the depth of the head track. This gap is typically about 25 mm in depth. The vertical studs are engaged within the head and base tracks and both the head and base tracks are slightly deformed to hold the vertical stud in place via friction. Sheathing, typically in the form of sheets of plasterboard, is then fixed to the vertical studs. Neither the base track nor the head track is fixed to the sheathing. A height of the sheathing is such that, when no vertical force is being applied to the wall structure, there is a gap between a top edge of the sheathing and the ceiling. The gap preferably has the same dimensions as the thickness or depth of the deflection head, which will be approximately 25 mm.

The provision of this deflection head, therefore, accommodates some vertical movement of the structure of the internal wall. In particular, in the event of building deflection causing a vertical force to be applied to the wall structure, the ceiling drops (or moves in a direction towards the floor) which in turn pushes or moves the head track in a downwards vertical direction towards the floor. This movement is possible due to the gap between the vertical stud and the head. The sheathing does not move during this deflection due to the sheathing only being attached to the vertical stud and not to the head track.

There is, however, no provision for horizontal movement in the wall structure. Accordingly, horizontal forces can cause movement of internal walls that are not designed to move. This manifests itself by way of sound being transferred through the walls, the sound being caused by movement of steel studs within the walls. This sound transference is unacceptable and there is a need to prevent or minimise the sound being produced and/or the transference of this sound so that the dwellings within the building are habitable.

Additionally, in any building, the effect of fire on the structure of the building must be considered. It is known that, during a fire, the sheathing of internal walls is the first defence against the spread of fire through the building. Furthermore, the sheathing offers some degree of thermal protection to the steel supporting frame. Ideally, wall construction and materials are such that the walls will remain in place for a prescribed length of time. This is usually prescribed in appropriate building regulations or standards.

It is known that failure of walls generally occurs due to deformation of the steel stud frame. Increased temperatures due to the fire lead to significant thermal expansion of the vertical steel studs within the wall. Temperatures of internal walls can reach 550° C. to 600° C. Assuming an initial ambient temperature of 20° C. and a stud length of 3.1 m, an increased temperature of 550° C. could cause a longitudinal, linear expansion of the stud of about 26 mm. Vertical studs are, however, constrained by traditional methods of construction and by the rest of the fabric of the building. Accordingly, the linear expansion cannot be accommodated resulting in deformation of the stud frame.

Against this background, it would be desirable to provide a wall system utilising traditional internal wall sheathing, such as plasterboard or drywall, that eliminates the sound transference from the steel frame when the building structure is moving under load, and increases the length of time before a steel stud deforms and fails in a fire. It would also be desirable to provide a wall system that can be easily installed by semi-skilled trade contactors, and which is both faster and safer to install than traditional steel frames.

SUMMARY OF THE INVENTION

A first aspect of the present invention provides a connector for connecting two stud members in a stud wall, the connector comprising:
  a block element made from a polymeric material, the block element comprising:
    a main body portion configured for insertion into an end of a first stud member, the main body portion comprising four substantially orthogonal side walls, an engagement slot being provided in a first one of the side walls and the engagement slot extending in a direction towards an opposite second one of the side walls;
    an attachment portion extending from the main body portion, the attachment portion including a pair of locking wings configured to engage with a second stud member such that, in use, a part of the second stud member is disposed in gaps between the locking wings and the main body portion; and
    a plate slot extending through a part of the attachment portion and through a part of the main body portion; and
  a plate element made from a metallic material, the plate element comprising first and second side edges and a notch in each of the first and second side edges, the plate element being disposed in the plate slot of the block element such that the notches of the plate element are aligned with the gaps in the block element.

The connector is designed to be connected to a stud member including a channel member having a C stud section. The connector is particularly suited to providing a connection between an end of a stud member, such as a vertical stud member, and a head track or base track of a stud frame. The polymeric block element minimises or eliminates metal-on-metal contact between the stud member and head track and/or base track, thereby reducing or eliminating noise due to this metal-on-metal contact when the stud member moves with respect to the head track and/or base track. Furthermore, the connector includes a metal plate that is designed to maintain the structural integrity of the stud wall in situations in which the block element fails, such as in the high temperatures of a fire.

In preferred embodiments the connector further comprises a second engagement slot provided in the second one of the side walls and the second engagement slot extending in a direction towards the opposite first one of the side walls.

The attachment portion preferably extends from a first end of the main body portion. The plate element is preferably planar.

The orientation of the plate slot with respect to the attachment portion is preferably such that the plate slot extends through the locking wings. In preferred embodiments the locking wings are provided by a locking element. The locking element may further comprise opposite first and second planar side walls. The first side wall is preferably disposed proximate and extends parallel to a third one of the side walls of the main body portion and the second side wall is preferably disposed proximate and extends parallel to a fourth one of the side walls of the main body portion. In this way the attachment portion may be inserted into a part of a stud member with clearance between the first and second planar side walls and the stud member, and then the connector may be moved into a connected position in which a part of the second stud member is disposed in gaps between the locking wings and the main body portion.

The block element preferably further comprises a load bearing portion extending from the attachment portion. The load bearing portion is preferably substantially tubular and the plate slot extends through the load bearing portion. In preferred embodiments the plate element does not protrude beyond an end of the load bearing portion, such that in use under normal conditions the second stud member contacts the load bearing portion and not the plate element.

In preferred embodiments the notches are disposed at a distance from a first end edge of the plate element, and the plate element is tapered such that a first distance between the first and second side edges of the plate element proximate the notches is greater than a second distance between the first and second side edges of the plate element at the first end edge. In circumstances in which the block element has failed, the stud member will move into contact with the plate element. In particular, thermal expansion of the stud member during a fire will cause the tapered plate element to be wedged or driven into an end of the stud member, thereby retaining the stud member in position.

Preferably the block element is made from polyamide 66. The plate element is preferably made from galvanised steel.

A second aspect of the present invention provides an assembly comprising:
 a first stud member comprising a first channel member having a base plate, a pair of side walls and a pair of lips extending from the side walls, an opening of the first channel member being defined between the lips;
 a second stud member, comprising a second channel member having a base plate, a pair of side walls and a pair of lips extending from the side walls, an opening of the second channel member being defined between the lips; and
 a connector according to the first aspect of the invention, one of the lips of the first stud member being partially disposed in the engagement slot or one of the engagement slots of the connector such that the main body portion of the connector is at least partially disposed in an end region of the first channel member, and the attachment portion of the connector being disposed in the second channel member such that a part of the lips of the second stud member are disposed in the gaps between the locking wings and the main body portion of the connector.

In preferred embodiments the attachment portion extends from a first end of the main body portion, the plate element is planar, and a longitudinal axis of the first stud member is perpendicular to a longitudinal axis of the second stud member.

The block element preferably comprises a load bearing portion extending from the attachment portion. Preferably the load bearing portion is substantially tubular and the plate slot extends through the load bearing portion. An end of the load bearing portion is preferably in contact with the base plate of the second channel member.

In preferred embodiments a distance between the base plate and the lip of a first one of the side walls of the first channel member is greater than a distance between the base plate and the lip of a second one of the side walls of the first channel member. In these embodiments a distance between opposite third and fourth side walls of the main body portion of the connector is preferably substantially equal to the distance between the base plate and the lip of the first one of the side walls of the first channel member, and the lip of the second one of the side walls is preferably partially disposed in the engagement slot or one of the engagement slots of the connector.

In preferred embodiments a distance between the base plate and the lip of a first one of the side walls of the second channel member is greater than a distance between the base plate and the lip of a second one of the side walls of the second channel member. A width of each of the notches is preferably substantially equal to the difference in the distances between the base plate and the lips of the first and second side walls of the second channel member. In this way, in use, the lip of a first one of the side walls of the second channel member is proximate or in contact with a first side of a first one of the notches, and the lip of a second one of the side walls of the second channel member is proximate or in contact with a second side of a second one of the notches.

The second stud member may be a head track or a base track of a stud wall.

A third aspect of the present invention provides a kit comprising:
 a first stud member comprising a first channel member having a base plate, a pair of side walls and a pair of lips extending from the side walls, an opening of the first channel member being defined between the lips;
 a second stud member, comprising a second channel member having a base plate, a pair of side walls and a pair of lips extending from the side walls, an opening of the second channel member being defined between the lips; and
 a connector according to the first aspect of the present invention.

The second stud member is preferably a head track of a stud wall, and the kit preferably further comprises a base track of a stud wall and a second connector according to the first aspect of the present invention.

A fourth aspect of the present invention provides a stud frame comprising:
  a first elongate channel member comprising a pair of side walls and a pair of lips extending from the side walls, the first channel member extending between first and second ends;
  a head track including a second elongate channel member comprising a pair of side walls and a pair of lips extending from the side walls, a longitudinal axis of the second channel member extending perpendicular to a longitudinal axis of the first channel member;
  a base track including a third elongate channel member comprising a pair of side walls and a pair of lips extending from the side walls, a longitudinal axis of the third channel member extending perpendicular to the longitudinal axis of the first channel member and parallel to the longitudinal axis of the second channel member;
  a first connector according to the first aspect of the invention, the main body portion of the first connector being at least partially disposed in a first end region of the first channel member such that a part of one of the lips of the first channel member is received in the engagement slot or one of the engagement slots, and the attachment portion of the first connector being engaged with the second channel member; and
  a second connector according to the first aspect of the invention, the main body portion of the second connector being at least partially disposed in a second end region of the first channel member such that a part of one of the lips of the first channel member is received in the engagement slot or one of the engagement slots, and the attachment portion of the second connector being engaged with the third channel member.

A fifth aspect of the present invention provides a wall comprising a stud frame according to the fourth aspect of the invention and a layer of sheathing secured to the first channel member, wherein the sheathing is free to move with respect to the second channel member and the third channel member. The sheathing preferably comprises a sheet of plasterboard.

A sixth aspect of the present invention provides a method of constructing a stud frame comprising:
  engaging a main body portion of a connector with an end region of a first elongate channel member by inserting a part of a lip of the first channel member in an engagement slot of the connector, the connector being according to the first aspect of the invention;
  inserting an attachment portion of the connector into a second elongate channel member with the locking wings of the connector in a first orientation with respect to the second channel member; and
  moving the connector with respect to the second channel member such that the locking wings are in second orientation with respect to the second channel member and a part of the second channel member is disposed in gaps between the locking wings and the main body portion of the connector to secure the first channel member to the second channel member with a longitudinal axis of the first channel member extending perpendicular to a longitudinal axis of the second channel member.

In preferred embodiments the step of moving the connector comprises rotating the connector through 90° about an axis of the connector.

The method may further comprise:
  engaging a main body portion of a second connector with a second end region of the first channel member by inserting a part of a lip of the first channel member in an engagement slot of the second connector, the second connector being according to the first aspect of the invention;
  inserting an attachment portion of the second connector into a third elongate channel member with the locking wings of the second connector in a first orientation with respect to the third channel member; and
  moving the second connector with respect to the third channel member such that the locking wings are in second orientation with respect to the third channel member and a part of the third channel member is disposed in gaps between the locking wings and the main body portion of the second connector to secure the first channel member to the third channel member with a longitudinal axis of the first channel member extending perpendicular to a longitudinal axis of the third channel member.

Preferred and/or optional features of each aspect and embodiment described above may also be used, alone or in appropriate combination, in the other aspects and embodiments also.

BRIEF DESCRIPTION OF THE DRAWINGS

The invention will now be further described by way of example only and with reference to the accompanying drawings, in which:

FIG. 9 is a perspective view of the connector of FIG. 4 engaged with an end of a stud member ready for insertion into a head track;

FIG. 10 is a perspective view of the connector of FIG. 4 engaged with an end of a stud member and a head track;

DESCRIPTION OF THE PREFERRED EMBODIMENTS

Figure 1:
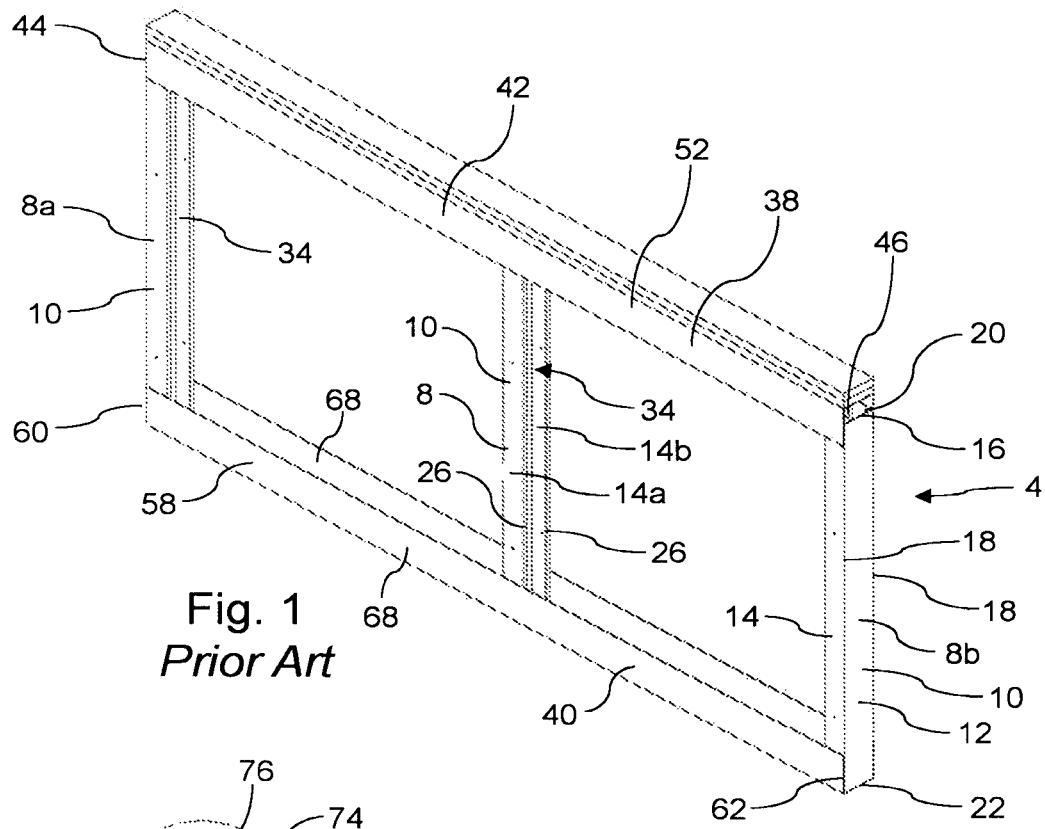
FIG. 1 is a perspective view of a stud frame of a prior art walling system, the stud frame comprising a plurality of stud members.
Figure 2:
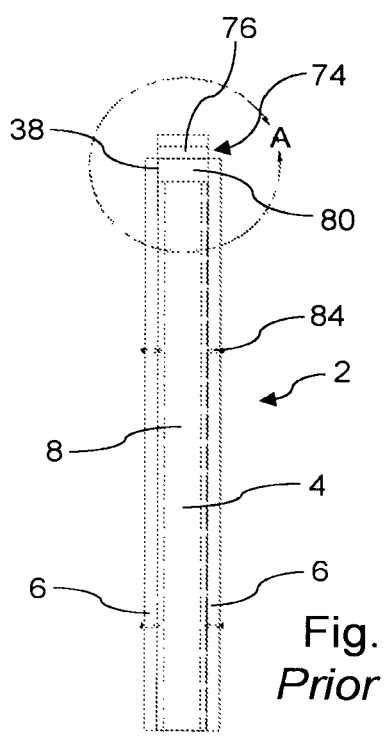
FIG. 2 is a cross-sectional view of a traditional prior art walling system.
Figure 3:
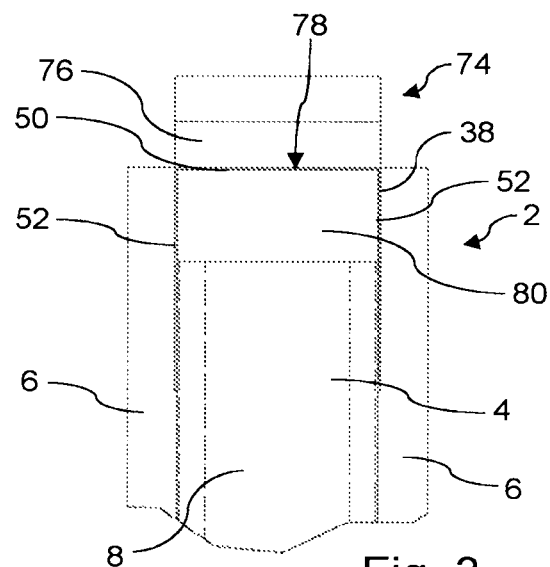
FIG. 3 is a detailed view of the area bounded by dashed circle A in FIG. 2.
Figure 4:
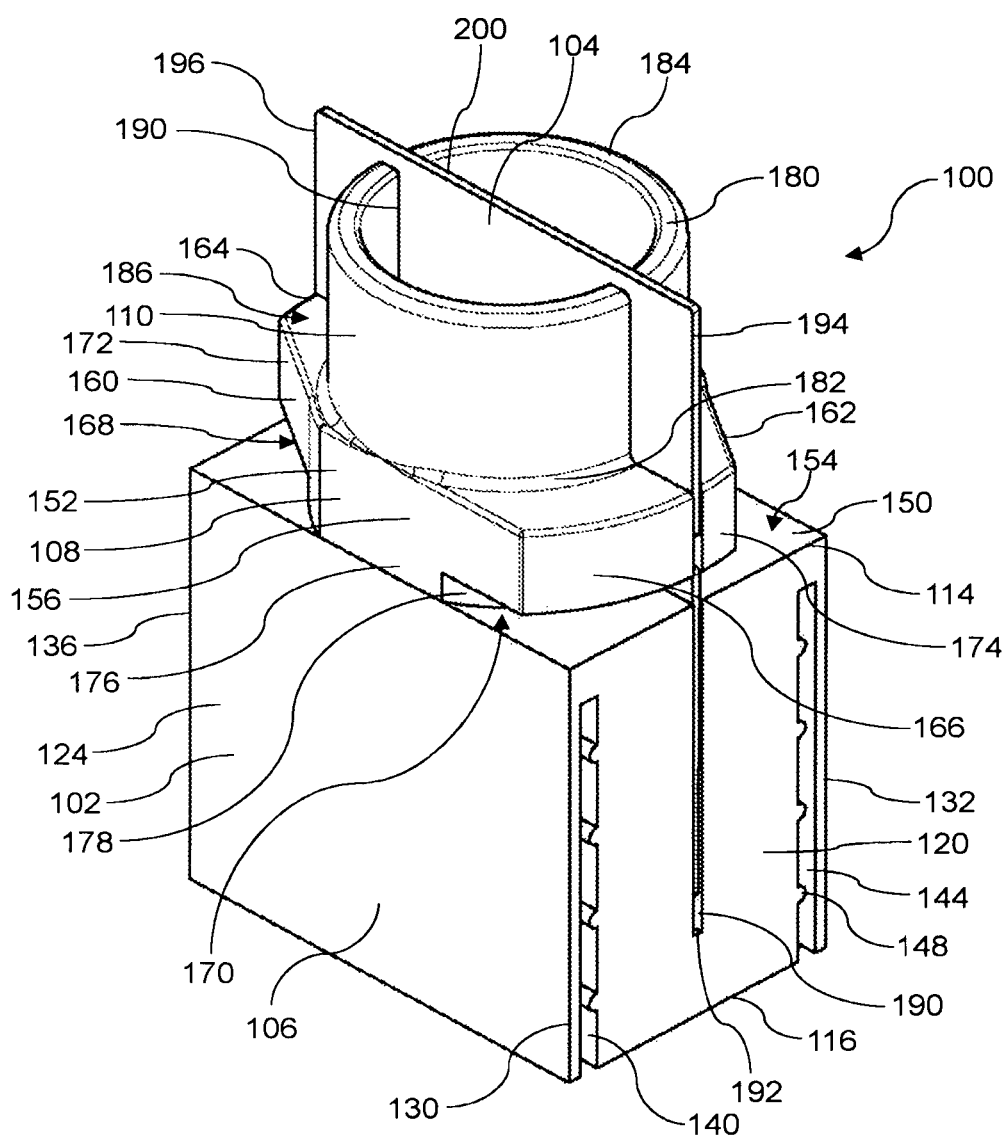
FIG. 4 is a perspective view of a connector for connecting two stud members according to a preferred embodiment of the present invention.
Figure 5:
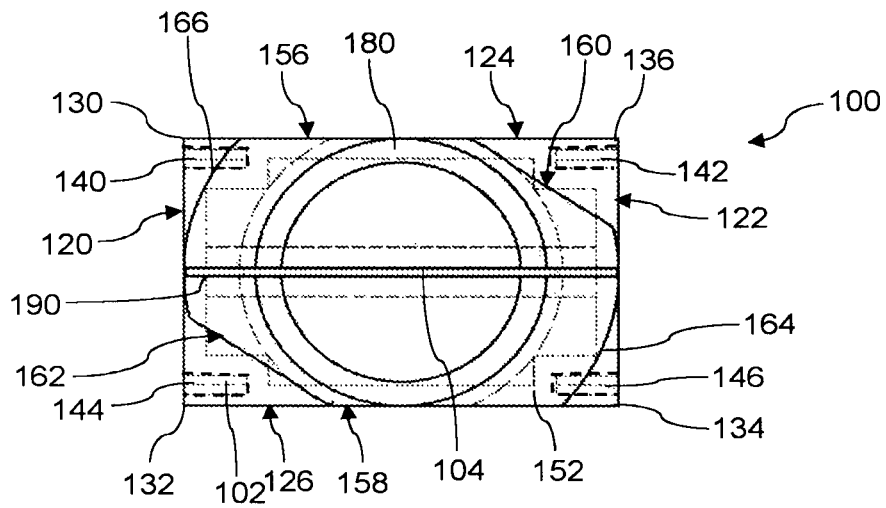
FIG. 5 is a plan view from above of the connector of FIG. 4.
Figure 6:
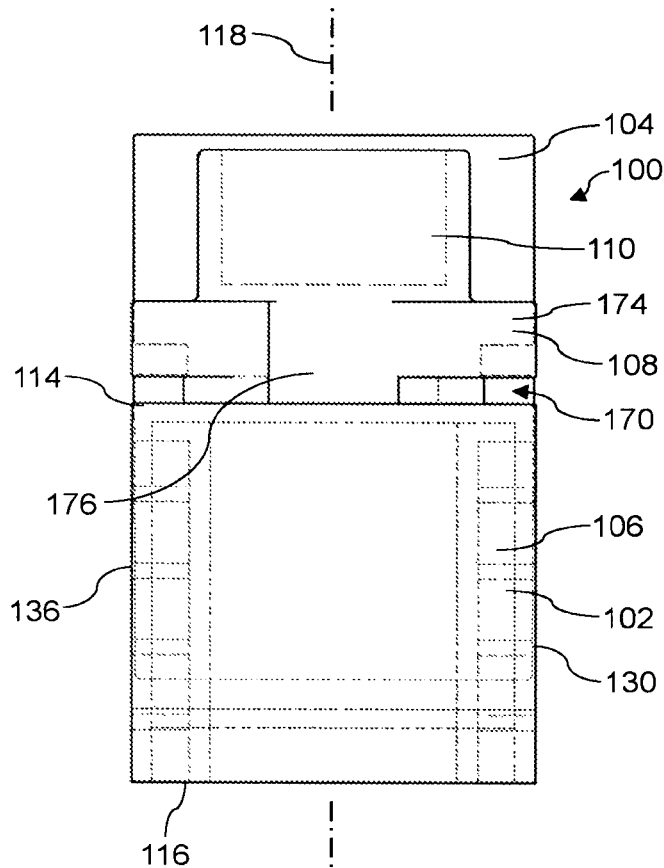
FIG. 6 is a plan view from a first side of the connector of FIG. 4.
Figure 7:
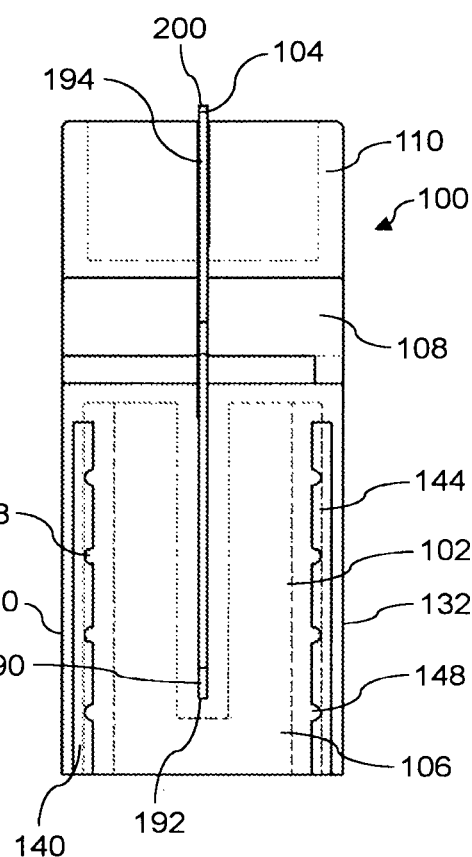
FIG. 7 is a plan view from a second side of the connector of FIG. 4, perpendicular to the view of FIG. 6.
Figure 8:
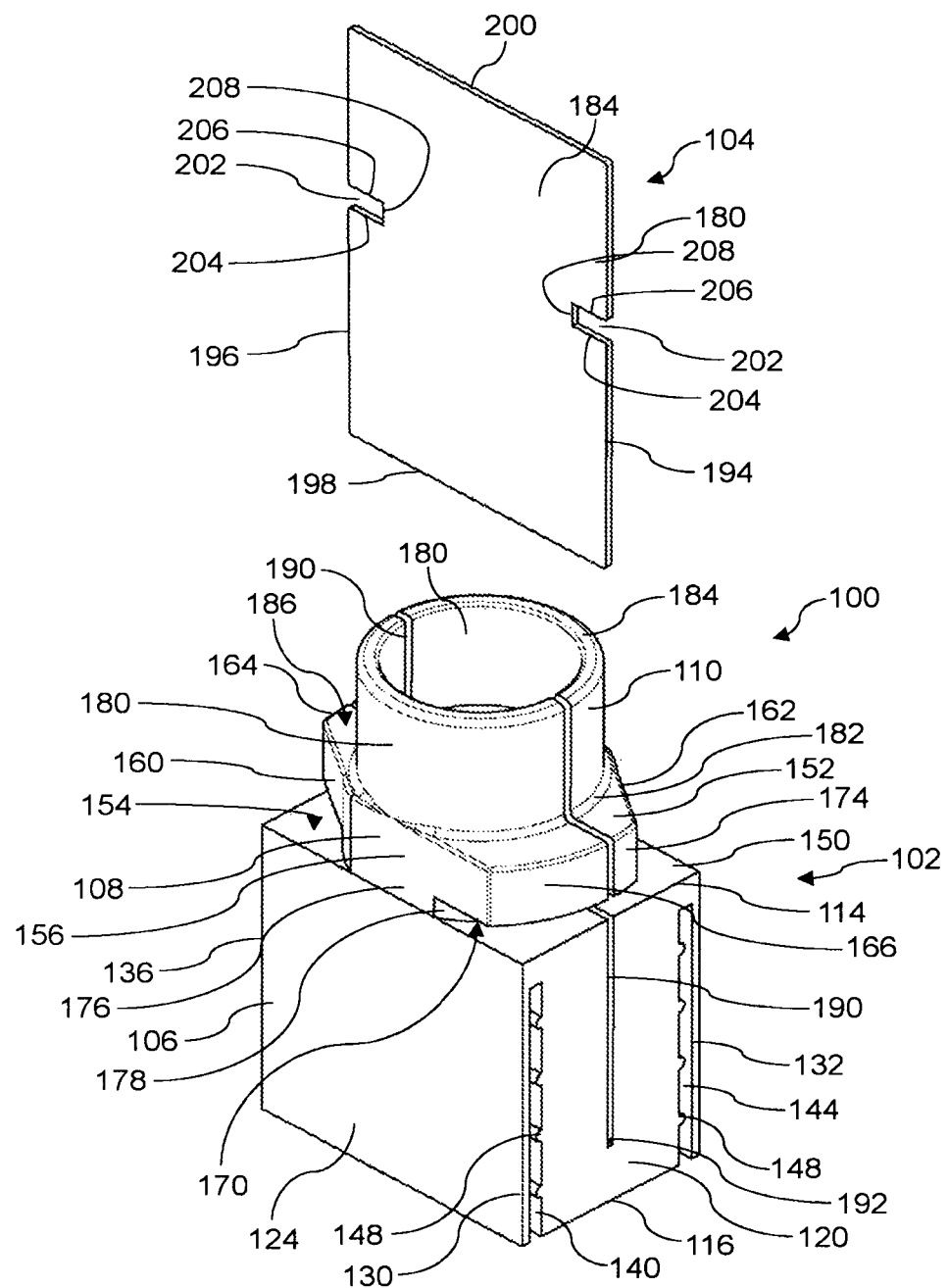
FIG. 8 is an exploded perspective view of the connector of FIG. 4.

A traditional, prior art structure of an internal wall 2 of a building is illustrated in FIGS. 1 to 3. The wall 2 comprises a supporting stud frame 4 and sheathing or outer cladding 6. The sheathing 6 will typically be attached to opposite first and second sides of the stud frame 4, such that the stud frame 4 forms an internal supporting frame of the wall 2.

The stud frame 4 comprises a plurality of stud members 8. Each stud member 8 preferably comprises a channel member 10 having a base plate 12 and two side plates 14. The base plate 12 has two opposite end edges 16 and two opposite side edges 18. One of the side plates 14 extends from each of the side edges 18 of the base plate 12. The side plates 14 extend from the base plate 12 in a direction substantially perpendicular to the base plate 12 such that the channel member 10 has a U-shaped cross-section.

Each of the base plate 12 and side plates 14 extends between first and second ends 20, 22 of the stud member 8. A longitudinal axis of the stud member 8 is defined along a line extending between the first and second ends 20, 22. The stud member 8 is preferably elongate in the longitudinal direction.

A lip 26 extends from a longitudinal edge 28 of each of the side plates 14 furthest from the base plate 12. Each lip 26 extends from the respective side plate 14 in a direction substantially perpendicular to the side plate 14. Furthermore, each lip 26 extends from the respective side plate 14 in a direction towards the other side plate 14. In this way, a first lip 26a extends from a first side plate 14a in a direction towards a second side plate 14b and a second lip 26b extends from the second side plate 14b in a direction towards the first side plate 14a.

Each lip 26 is preferably planar and includes a first, internal surface facing towards the base plate 12 of the channel member 10, and a second, external surface facing in an opposite direction. An opening 34 of the channel member 10 is defined between distal, longitudinal edges of the first and second lips 26. A stud member 8 having this configuration is commonly referred to as having a C stud section.

A height of each of the side plates 14, defined as the distance between the longitudinal edge 28 and the base plate 12, is preferably different. In this example, a height of the first side plate 14a is greater than a height of the second side plate 14b. This allows two stud members 8 to be connected together end-to-end.

Referring again to FIGS. 1 to 3, the stud frame 4 comprises a plurality of vertical or upright stud members 8, a head track 38 and a base track 40. The head track 38 comprises an elongate header channel member 42. The header channel 42 of the head track 38 extends between first and second ends 44, 46, which defines a longitudinal axis of the head track 38. The header channel 42 comprises a top plate 50 and two side plates 52. The top plate 50 has two opposite end edges and two opposite side edges. One of the side plates 52 extends from each of the side edges of the top plate 50. The side plates 52 extend from the top plate 50 in a direction substantially perpendicular to the top plate 50 such that the header channel 42 has a U-shaped cross-section. The base track 40 comprises an elongate base channel member 58. The base channel 58 of the base track 40 extends between first and second ends 60, 62, which defines a longitudinal axis of the base track 40. The base channel 58 comprises a bottom plate and two side plates 68. The bottom plate has two opposite end edges and two opposite side edges. One of the side plates 68 extends from each of the side edges of the bottom plate. The side plates 68 extend from the bottom plate in a direction substantially perpendicular to the bottom plate such that the base channel 58 has a U-shaped cross-section.

Each of the stud members 8, head track channel member 42 and base track channel member 58 are preferably made from a suitable steel material.

The stud frame 4 further comprises a deflection head 74. The deflection head 74 comprises an elongate member 76 fixed to a first surface 78 of the top plate 50, on an opposite side of the top plate 50 to the side plates 52. The elongate member 76 preferably comprises a layer of plasterboard. In preferred embodiments the deflection head 74 comprises at least two layers of plasterboard. As will be described further below, a depth or thickness of the deflection head 74 defines the maximum vertical movement that can be accommodated by the stud frame 4. As such, the depth of the deflection head 74, and therefore the number of layers of plasterboard, will be determined by the desired or required maximum vertical movement. The plasterboard of the deflection head 74 is fire rated.

To construct a stud frame 4 to form a wall 2 the deflection head 74 is fixed directly to a ceiling soffit or underside of the ceiling. The head track channel 42 is then fixed through the deflection head 74 into the inherited structure, i.e. the ceiling, to provide a strong fixing. The base track 40 is fixed to a floor such that the base track 40 is aligned vertically with and parallel to the head track 38. A pair of upright stud members 8 are disposed at the ends of the head track 38 and the base track 40. In particular, a first upright stud member 8a extends between the first end 44 of the head track 38 and the first end 60 of the base track 40 and a second upright stud member 8b extends between the second end 46 of the head track 38 and the second end 62 of the base track 40. Typically, the upright members 8a, 8b at the ends of the head track 38 and base track 40 will be disposed adjacent adjoining walls of the building. Additional upright stud members 8 are then inserted into the base track 40 and head track 38 between the end pair of upright stud members 8a, 8b.

The upright stud members 8 are not fixed to the base track 40 or the head track 38 with mechanical fasteners. Instead, there is a friction fit of the ends of the upright stud members 8 between the side plates 68, 52 of the base track 40 and the head track 38, respectively. In particular, a spacing or gap between the side plates 68, 52 of each of the base track 40 and the head track 38 is such that the side plates 68, 52 grip the respective ends of the upright stud members 8 when they are disposed within the header channel 42 and base channel 58. The resilience of the side plates 68, 52, due to the shape of the header channel 42 and the base channel 58, and the material from which they are made, means that the side plates 68, 52 can be forced apart to insert the ends of the upright stud members 8 between the side plates 68, 52, and the side plates 68, 52 are then biased to return to a position in which they grip the stud member 8.

The length of each of the upright stud members 8 is such that when a first, lower end of the stud member 8 is fully inserted into the base channel 58 there is a gap 80 between the second, upper end of the stud member 8 and a second surface 82 of the top plate 50 of the head track 38. The size or depth of this gap 80 is substantially that same as the depth or thickness of the deflection head 74. The gap 80 is designed to accommodate vertical sliding movement of the end of the stud member 8 within the head track 38 caused by vertical forces applied to the wall 2. In other words the gap 80 between the end of the stud member 8 and the head track 38 permits vertical deflection or movement of the head track 38 relative to the upright stud members 8 due to external forces applied to the wall 2.

The additional upright stud members 8 disposed along the length of the wall 2 are positioned such that the stud members 8 support the wall sheathing 6. Preferably the stud members 8 are located at the edges of each of the sheathing boards used to cover the wall 2 and at the centre of the board width. These upright stud members 8 are accurately positioned so that the when two sheets of sheathing board are erected adjacent to each other a stud member 8 will support the edges of both adjoining sheets.

The wall sheathing 6 preferably comprises sheets of plasterboard. A height or vertical dimension of the sheathing boards is equal to the distance between the top plate 50 of the head track 38 (underside of the deflection head 74) and the floor. The sheathing boards are fixed to the upright stud members 8. Preferably the sheathing boards are fixed to the upright stud members 8 using suitable mechanical fasteners 84 such as screws. Importantly, the sheathing boards are only fixed to the upright stud members 8 and not to either the head track 38 or the base track 40.

As shown most clearly in FIGS. 2 and 3, an upper edge region of each of the sheathing boards extends over an external surface of the side plates 52 of the head track 38. As such, a part of each of the side plates 52 of the header channel 42 is gripped or clamped between the upper end of an upright stud member 8 and the upper edge region of a sheathing board. Similarly, a lower edge region of each of the sheathing boards extends over an external surface of the side plates 68 of the base track 40. As such, a part of each of the side plates 68 of the base channel 58 is gripped or clamped between the lower end of an upright stud member 8 and the lower edge region of a sheathing board.

In the event of deflection or movement in the building, a vertical force is imposed on the deflection head 74 forcing the head track 38 to move downwards relative to the upright stud members 8. Consequently, as the deflection head 74 and head track 38 move downwards the upper edge region of the sheathing board slides over the side plates 52 of the head track 38 and over the deflection head 74. Relative vertical movement of the head track 38, stud members 8 and sheathing 6 is limited by contact between an upper edge of the sheathing boards and the ceiling soffit or underside of the ceiling. This distance is predetermined by the depth of the deflection head 74 and the depth of the gap 80 in the header channel 42. This distance is predetermined according to the specification of the building.

The issues that arise with this system are that each upright stud member 8 has to be accurately cut to length to allow for the required vertical movement. Failure to make this allowance, i.e. having an upright stud member 8 that is too long such that the gap 80 between the end of the stud member 8 and the head track 38 is too small, may result in contact between the end of the stud member 8 with the head track 38 and, in some cases, may result in deformation of the upright stud members 8 when building movement occurs.

A further consideration is that build tolerance of both the floors and ceilings are typically greater than the expected deflection movement. Accordingly, each upright stud member 8 has to be cut at its known position within the stud frame 4. This adds complexity and time to the construction of the stud frame 4 and internal wall 2.

Because, in most cases, both the head track 38 and the upright stud members 8 are manufactured from steel, when relative movement between the stud members 8 and the head track 38 occurs, sound is generated, resulting in undesirable noise emanating from the walls 2. In some cases, the sound may be transferred through the structure of the building such that occupants of the building misinterpret the sound as emanating from the floors.

It will be appreciated from the above description that conventional methods of constructing internal walls 2 only considers and makes allowances for a downward or vertical force being applied to the wall 2. No provision is made for either side-to-side (horizontal) movement of the wall 2, due to pure horizontal forces, or more complex movement of the wall structure, due to a combination of vertical and horizontal forces. Clearly, in these cases, as there is no part of the structure of the wall 2 that can accommodate this movement, the forces cause movement (e.g. bending and twisting) of the stud members 8 themselves, which creates increased sound levels.

The present invention provides a stud connector that may be used to form a connection between stud members within a stud frame of a wall. In particular the connector may be used to provide a connection between a stud member and the head track, or between a stud member and the base track.

The connector of the present invention aims to eliminate or reduce the sound emanating from the walls due to relative movement of the stud member, head track and base track. Furthermore, the connector of the present invention preferably provides support and a robust connection between the stud member and the head track or base track, even at increased temperatures experienced during a fire.

A preferred embodiment of a stud connector 100 is shown in FIGS. 4 to 8. The stud connector 100 is designed to connect an end of a vertical or upright stud member 8 to a horizontal stud member or to a head track 38' or to a base track 40'. In particular, the stud connector 100 connects the vertical stud member 8 to the horizontal stud member, head track 38' or base track 40' such that the longitudinal axis of the vertical stud member 8 is perpendicular to the longitudinal axis of the horizontal stud member, head track 38' or base track 40'. The stud connector 100 permits movement of the vertical stud member 8 relative to the horizontal stud member, head track 38' or base track 40' in a direction parallel to the axis of the vertical stud member 8, as well as movement of the vertical stud member 8 relative to the horizontal stud member, head track 38' or base track 40' in a direction parallel to the axis of the horizontal stud member, head track 38' or base track 40'.

In embodiments in which this connector 100 is used to connect a vertical stud member 8 to a head track 38' or base track 40' it will be appreciated that the head track 38' or base track will have the same shape, configuration and profile as a stud member 8. In other words, the head track 38' will comprise a stud member extending horizontally, with the base plate of the channel member uppermost and the opening 34' of the channel member below the base plate of the channel member. Similarly, the base track 40' will comprise a stud member extending horizontally, with the base plate of the channel member lowermost and the opening 34' of the channel member above the base plate of the channel member.

The stud connector 100 comprises a block element 102 and a plate element 104. The block element 102 comprises a main body portion 106, an attachment portion 108, and a load bearing portion 110. The block element 102 is preferably of unitary, one-piece construction.

The main body portion 106 comprises a tubular member 112. The tubular member 112 extends between first and second ends 114, 116 along a longitudinal axis 118 of the tubular member 112. The tubular member 112 may be of any suitable length (parallel to the longitudinal axis 118) dependent on the desired or predicted range of movement between a vertical stud member 8 and the connector 100.

Figure 13:
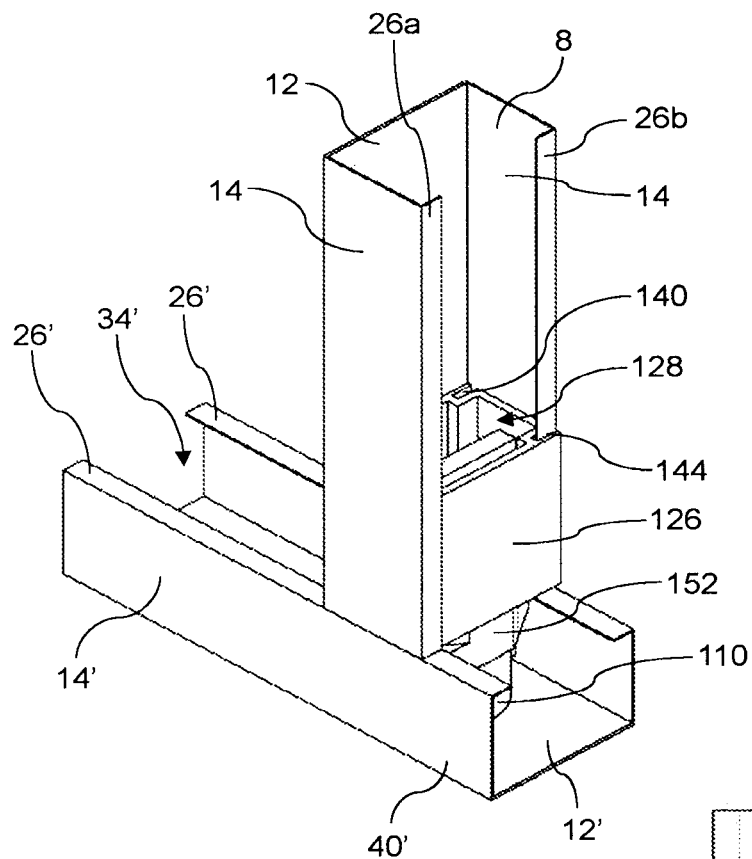
FIG. 13 is a perspective view of the connector of FIG. 4 engaged with an end of a stud member and a base track.

The tubular member 112 has a substantially rectangular cross-sectional shape transverse to the axis 118. In this embodiment the tubular member 112 comprises opposite first and second side walls 120, 122, and opposite third and fourth side walls 124, 126. The side walls 120, 122, 124, 126 surround and define a bore 128 of the tubular member 112 (see FIG. 13). Preferably an outer perimeter of the tubular member 112 is substantially rectangular.

Each of the side walls 120, 122, 124, 126 extends between the first and second ends 114, 116 in a direction parallel to the longitudinal axis 118. The first side wall 120 extends between first and second side edges 130, 132 in a direction perpendicular to the longitudinal axis 118. The second side wall 122 extends between third and fourth side edges 134, 136 in a direction perpendicular to the longitudinal axis 118. The third side wall 124 extends between the first and fourth side edges 130, 136 in a direction perpendicular to the longitudinal axis 118. The fourth side wall 126 extends between the second and third side edges 132, 134 in a direction perpendicular to the longitudinal axis 118.

A width of the fourth side wall 126 (between second and third side edges 132, 134) and a width of the third side wall 124 (between first and fourth side edges 130, 136) is preferably substantially equal to a distance between internal surfaces of the side walls 14 of the stud member 8.

A first slot 140 is provided in the first side wall 120 proximate the first side edge 130. The first slot 140 extends in a plane parallel to a plane of the third side wall 124. The first slot 140 extends in a first direction towards the second side wall 122. The distance that the slot 140 extends in this first direction defines a depth of the slot 140. The first slot 140 extends in a second direction parallel to the axis 118 of the tubular member 112. The distance that the slot 140 extends in this second direction defines a length of the slot 140. In this embodiment the slot 140 extends in the second direction along the full length of the tubular member 112.

In this embodiment the main body portion 106 further comprises a second slot 142 (see FIG. 13) provided in the second side wall 122 of the tubular member 112 proximate the fourth side edge 136. The second slot 142 extends in a plane parallel to a plane of the third side wall 124. The second slot 142 extends in a first direction towards the first side wall 120. The distance that the slot 142 extends in this first direction defines a depth of the slot 142. The second slot 142 extends in a second direction parallel to the axis 118 of the tubular member 112. The distance that the slot 142 extends in this second direction defines a length of the slot 142. In this embodiment the slot 142 extends in the second direction along the full length of the tubular member 112.

In preferred embodiments the main body portion 106 further comprises third and fourth slots 144, 146. In these embodiments the third slot 144 is provided in the first side wall 120 of the tubular member 112. The third slot 144 extends in a plane parallel to a plane of the fourth side wall 126. The third slot 144 extends in a first direction towards the second side wall 122. The distance that the slot 144 extends in this first direction defines a depth of the slot 144. The third slot 144 extends in a second direction parallel to the axis 118 of the tubular member 112. The distance that the slot 144 extends in this second direction defines a length of the slot 144. The third slot 144 preferably extends in the second direction along the full length of the tubular member 112. The fourth slot 146 is provided in the second side wall 122 of the tubular member 112. The fourth slot 146 extends in a plane parallel to a plane of the fourth side wall 126. The fourth slot 146 extends in a first direction towards the first side wall 120. The distance that the slot 146 extends in this first direction defines a depth of the slot 146. The fourth slot 146 extends in a second direction parallel to the axis 118 of the tubular member 112. The distance that the slot 146 extends in this second direction defines a length of the slot 146. The fourth slot 146 preferably extends in the second direction along the full length of the tubular member 112.

A width of each of the slots 140, 142, 144, 146 is defined as the distance in a third direction perpendicular to both the first direction and the second direction. The dimensions of each of the first, second, third and fourth slots 140, 142, 144, 146 are such that a lip 26 of a stud member 8 is receivable and engageable in the slot 140, 142, 144, 146, as described further below.

In this embodiment an internal surface or a side wall of each of the slots 140, 142, 144, 146 includes a plurality of grip features 148. The grip features 148 comprise ridges disposed on one of the side walls of each of the slots 140, 142, 144, 146. The ridges protrude into the respective slot 140, 142, 144, 146 such that, in use, when a lip 26 of a stud member 8 is inserted into the slot 140, 142, 144, 146 the ridges press against and grip a surface of the lip 26.

A distance between the outer surface of the fourth side wall 126 and the first and/or second slots 140, 142 is preferably substantially equal to a distance between an internal surface of the base plate 12 of the stud member 8 and the lip 26 extending from the second side wall 14*b* of the stud member 8. Similarly, a distance between the outer surface of the third side wall 124 and the third and/or fourth slots 144, 146 is preferably substantially equal to a distance between an internal surface of the base plate 12 of the stud member 8 and the lip 26 extending from the second side wall 14*b* of the stud member 8.

The attachment portion 108 of the stud connector 100 comprises a base plate 150. In this embodiment the base plate 150 forms a cap at the first end 114 of the tubular member 112. In particular, the base plate 150 has a perimeter having the same shape and dimensions as the external shape and dimensions of the tubular member 112. The tubular member 112 extends from a first face of the base plate 150, such that the longitudinal axis 118 of the tubular member 112 is perpendicular to a plane of the base plate 150. In this way the base plate 150 forms a closed end to each of the slots 140, 142, 144, 146 at the first end 114 of the tubular member 112.

The attachment portion 108 further comprises a locking element 152. The locking element 152 extends from a second face 154 of the base plate 150. The locking element 152 has an irregular hexagonal perimeter. First and second side walls 156, 158 of the locking element are planar and parallel to each other. The first and second side walls 156, 158 are preferably of equal lengths. The first side wall 156 is disposed proximate and extends parallel to the third side wall 124 of the tubular member 112. The second side wall 158 is disposed proximate and extends parallel to the fourth side wall 126 of the tubular member 112. Third and fourth side walls 160, 162 of the locking element 152 are planar and parallel to each other. The third side wall 160 extends from a first edge of the first side wall 156. The fourth side wall 162 extends from a first edge of the second side wall 158. The third and fourth side walls 160, 162 are preferably of equal lengths. Fifth and sixth side walls 164, 166 preferably have a convex curvature. The fifth side wall 164 extends between a second edge of the second side wall 158 and the third side wall 160. The sixth side wall 166 extends between a second edge of the first side wall 156 and the fourth side wall 162. The fifth and sixth side walls 164, 166 are preferably of equal lengths. A maximum dimension of the locking element 152, in a direction perpendicular to the longitudinal axis 118 and parallel to the third and fourth side walls 124, 126 of the main body portion 106, between the fifth and sixth side walls 164, 166, is preferably the same as the distance between outer surfaces of the first and second side walls 120, 122 of the main body portion 106.

The locking element 152 includes a pair of undercuts 168, 170. A first undercut 168 defines a first locking wing 172 of the locking element 152 including the fifth side wall 164, and a second undercut 170 defines a second locking wing 174 of the locking element 152 including the sixth side wall 166. In this way, there is a gap defined between each of the fifth and sixth side walls 164, 166 and the second face 154 of the base plate 150. Each of the first and second locking wings 172, 174 extends from a stem portion 176 of the locking element 152. In this embodiment each of the first and second wings 172, 174 extends from a clearance surface 178 of the stem portion 176.

The load bearing portion 110 comprises a split tubular member 180. The split tubular member 180 extends longitudinally between a first end 182 and a second end 184. Furthermore, the split tubular member 180 extends from a major face 186 of the locking element 152; the major face 186 of the locking element 152 extending in a plane substantially perpendicular to the longitudinal axis 118. The second end 184 of the split tubular member 180 defines an end of the block element 102 furthest from the second end 116 of the main body portion 106. A height or longitudinal dimension of the block element 102 is therefore defined between the second end 116 of the main body portion 106 and the second end 184 of the load bearing portion 110.

A length of the split tubular member 180 in the longitudinal direction is such that the distance between the undercuts 168, 170 and the second end 184 is substantially the same as the smaller of the heights of the two side plates 14 of a stud member 8. Additionally, the distance between the second face 154 of the base plate 150 and the second end 184 is substantially the same as the larger of the heights of the two side plates 14 of a stud member 8.

The split tubular member 180 has a circular cross-sectional shape perpendicular to a longitudinal axis of the split tubular member 180. The longitudinal axis of the split tubular member 180 is coaxial with the longitudinal axis 118 of the tubular member 112 of the main body portion 106. An outer diameter of the split tubular member 180 is substantially equal to a distance between the first and second side walls 156, 158 of the locking element 152 in a direction perpendicular to a plane of each of the first and second side walls 156, 158.

The block element 102 comprises a split or slot 190 that extends from the second end 184 of the load bearing portion 110, through the load bearing portion 110, through the attachment portion 108 and into the main body portion 106. A closed end 192 of the slot 190 is disposed in the main body portion 106 at a distance from the second end 116. A depth of the slot 190 is defined, in a longitudinal direction, as the distance between the second end 184 of the load bearing portion 110 and the closed end 192.

A plane of the slot 190, in a direction perpendicular to the longitudinal axis 118, is parallel to the third and fourth side walls 124, 126 of the main body portion 106. The slot 190 extends fully through the tubular member 180 of the load bearing portion 110 such that the tubular member 180 is split into two halves. The slot 190 extends through the locking element 152, such that the slot 190 extends through the first and second locking wings 172, 174. The slot 190 extends fully through the locking element 152 such that the first side wall 156 and third side wall 160 are disposed in a first half of the locking element 152 on a first side of the slot 190, and the second side wall 158 and the fourth side wall 162 are disposed in a second half of the locking element 152 on a second side of the slot 190. Finally, the slot 190 extends through the first and second side walls 120, 122 of the main body portion 106.

The block element 102 is preferably of unitary, one-piece construction. The block element 102 is preferably made from a suitable semi-rigid or resilient polymer material. The block element 102 is preferably formed from a suitable fire resistant polymer. In preferred embodiments the block element is formed from a nylon polymer, such as Nylon 6/6.

The slot 190 of the block element 102 is sized to receive the plate element 104. The plate element 104 is preferably made from a suitable metal. In preferred embodiments the plate element 104 is made from galvanised steel.

The plate element 104 comprises a single sheet or plate 104 having opposite first and second side edges 194, 196, and opposite first and second end edges 198, 200. The first and second end edges 198, 200 are preferably parallel to each other. The plate element 104 is preferably tapered such that a distance between the first and second side edges 194, 196 at the first end edge 198 is slightly less than a distance between the first and second side edges 194, 196 at the second end edge 200.

A notch 202 is disposed in each of the first and second side edges 194, 196. Each notch 202 includes opposite first and second sides 204, 206 and a base 208. Each of the first and second sides 204, 206 extends substantially parallel to the first and second end edges 198, 200 of the plate element 104. A width of each notch 202, defined as the distance between the first and second sides 204, 206, is slightly greater than the difference in the heights of the first side plate 14a and the second side plate 14b of a stud member 8. A depth of each of the notches 202, defined as the distance between the base 208 of the notch 202 and the respective side edge 194, 196 of the plate element 104, is slightly greater than the distance each lip 26 extends from the respective side plate 14 of the stud member 8. Furthermore, the distance between the bases 208 of the notches 202 is slightly less than the width of the opening 34' of the channel member of the head track 38' or base track 40'.

A distance between the second side 206 of each of the notches 202 and the second end edge 200 of the plate element 104 is slightly less than the smaller of the heights of the two side plates 14 of a stud member.

FIGS. 4 to 7 show the plate element 104 partially inserted into the slot 190 in the block element 102. With the plate element 104 fully inserted, as shown in FIG. 9, the second end edge 200 of the plate element 104 is in contact with the closed end 192 of the slot 190. Furthermore, the notches 202 are aligned with the undercuts 168, 170 (or gaps defined between the fifth and sixth side walls 164, 166 and the second face 154 of the base plate 150). In this fully inserted position the second end edge 200 is disposed below the second end 184 of the load bearing portion 110, i.e. a dimension of the plate element 104 between the first and second end edges 198, 200 is less than the depth of the slot 190 (the distance between the second end 184 of the load bearing portion 110 and the closed end 192). In this way, the plate element 104 does not protrude beyond the second end 184 of the load bearing portion 110.

Furthermore, a width of the plate element 104 (the distance between the first and second side edges 194, 196) is less than the distance between outer surfaces of the first and second side walls 120, 122, and is less than a distance between the fifth and sixth side walls 164, 166 of the locking element 152.

The plate element 104 is held in the slot 190 of the block element 102 due to the resilience of the material of the block element 102.

In use, the stud connector 100 is engaged with or partially inserted into an end of a stud member 8. The stud connector 100 is secured to an end of a stud member 8, as illustrated in FIG. 9, such that an end portion of the stud member 8 is engaged with the main body portion 106 of the connector 100.

The end portion of the stud member 8 slidingly engages with the tubular member 112 such that the first and fourth side walls 120, 126 of the tubular member 112 are fully disposed within the channel member 10 of the stud 8. The dimensions of the tubular member 112 are such that the lip 26b extending from the second side wall 14b of the stud member 8 locates in the second slot 142 in the second side wall 122 of the tubular member 112. A region of the second side wall 122, between the second slot 142 and the fourth side wall 126, is therefore also disposed within the channel member 10. Because the height of the first side wall 14a of the stud member 8 is greater than the height of the second side wall 14b, the dimensions of the tubular member 112 are such that the lip 26a extending from the first side wall 14a extends over an edge region of an outer surface of the third side wall 124 of the tubular member 112 proximate the first side wall 120.

Engagement of the tubular member 112 with the stud member 8 in this way means that the stud member 8 is able to slide with respect to the tubular member 112 in a direction parallel to the axis of the stud member 8 (and parallel to the axis 118 of the tubular member 112).

The stud member 8 engaged with the tubular member 112 of the connector 100 will form a vertical stud member 8 of a stud frame of a wall. To connect the vertical stud member 8 to a horizontal stud member or a head track 38' the locking element 152 of the connector 100 is engaged with the horizontal stud member or head track 38'.

In particular, the locking element 152 of the connector 100 is inserted through the opening 34' of the horizontal stud member or head track 38' with the connector 100 in a first orientation. In the first orientation the first and second side walls 156, 158 of the locking element 152 are preferably substantially parallel to first and second side walls 14' of the horizontal stud member or head track 38'. With the locking element 152 partially disposed within the channel of the horizontal stud member or head track 38' such that the lips 26' are aligned with the stem portion 176 of the locking element 152, the connector 100 is rotated to a second orientation with respect to the horizontal stud member or head track 38'. In the second orientation the first and second side walls 156, 158 of the locking element 152 are preferably substantially perpendicular to the first and second side walls 14' of the horizontal stud member or head track 38'. In preferred embodiments, therefore, the connector 100 is rotated through about 90° about its longitudinal axis 118 between the first and second orientations.

With the connector 100 in the second orientation a part of each of the first and second lips 26' of the horizontal stud member or head track 38' is disposed in a respective one of the first and second undercuts 168, 170. In this way, a part of the first lip 26a' is disposed between the first locking wing 172 and the base plate 150 of the attachment portion 108 of the connector 100 and a part of the second lip 26b' is disposed between the second locking wing 174 and the base plate 150 of the attachment portion 108 of the connector 100.

The position of the plate element 104 relative to the block element 102 means that, with the connector 100 inserted into the horizontal stud member or head track 38' and in the second orientation, the lips 26' of the horizontal stud member or head track 38' are also disposed in the notches 202 of the plate element 104.

Figure 11:
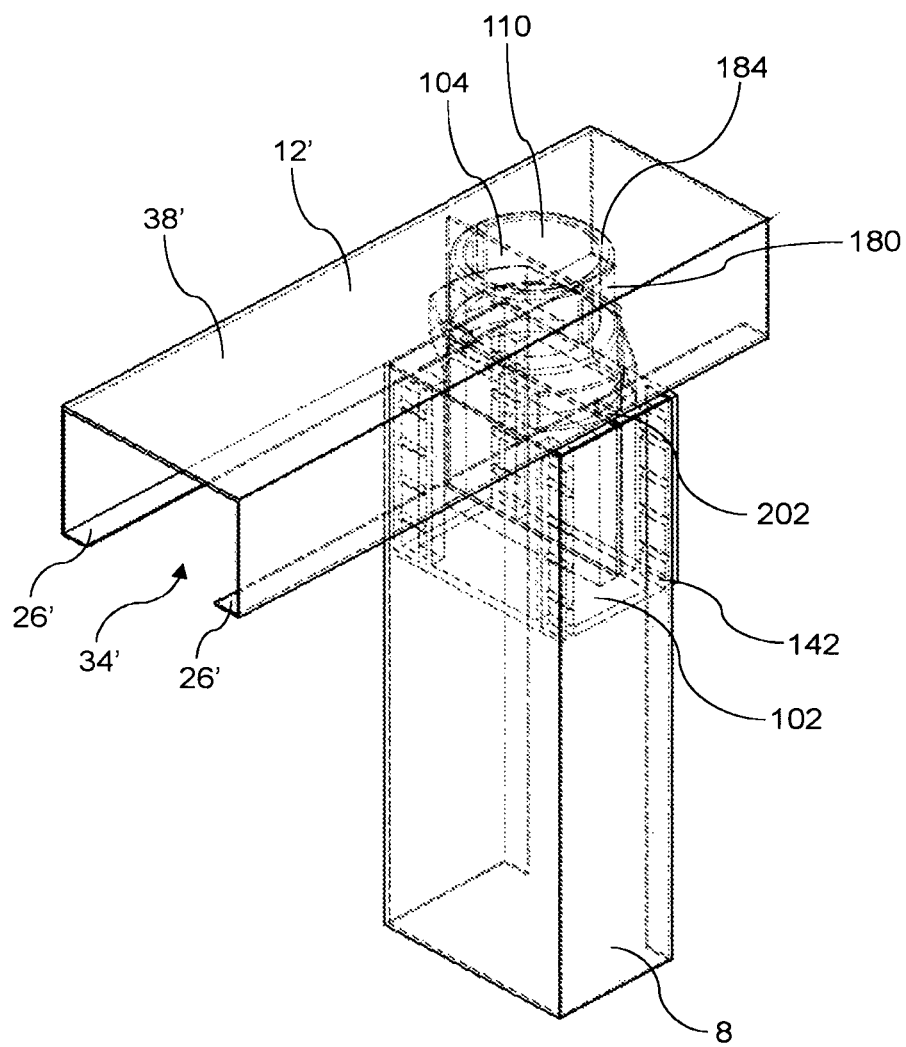
FIGS. 11 and 12 show the connector of FIG. 4 engaged with an end of a stud member and a head track.
Figure 12:
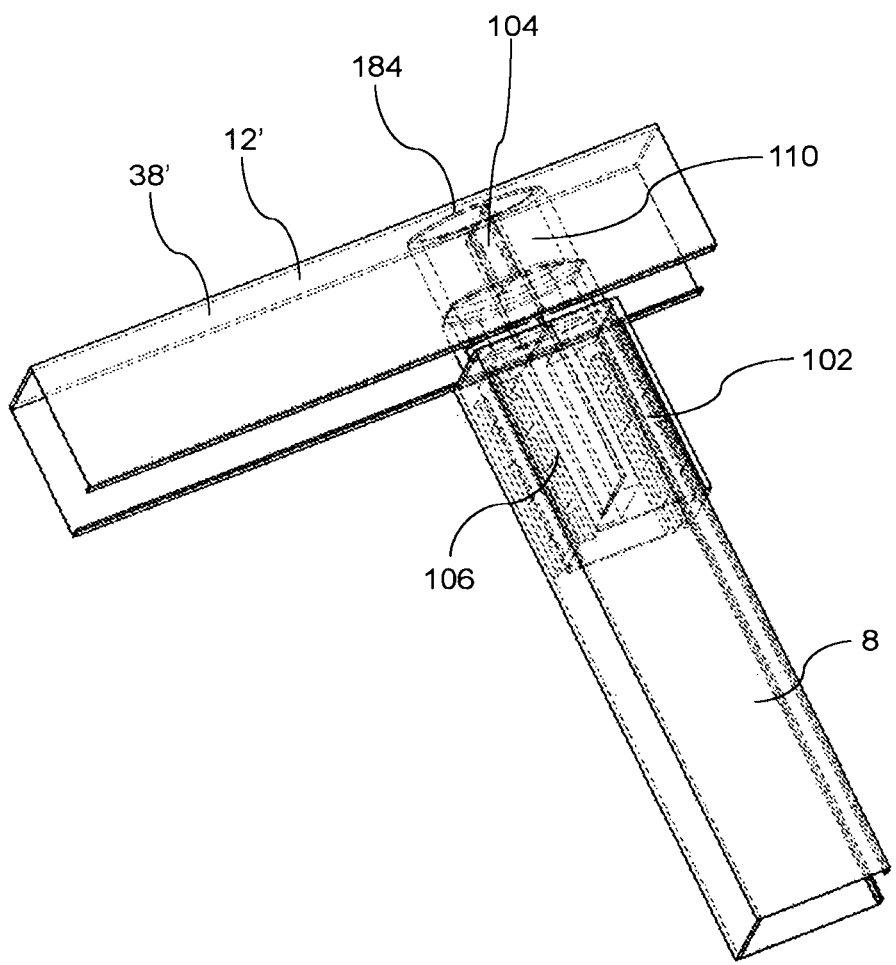

Furthermore, the dimensions of the block element 102, and in particular the load bearing portion 110, are such that the second end 184 of the split tubular member 180 is in contact with an inner surface of the base plate 12', as shown in FIGS. 11 and 12. In this way, loads from the horizontal stud member or head track 38' will be transferred to the vertical stud member 8 through the block element 102 of the connector 100.

It will be appreciated that the first and second slots 140, 142 are provided in the main body 106 of the connector 100 to enable the connector 100 to be engaged with either of the first and second ends of the stud member 8. The third and fourth slots 144, 146 are provided in the main body 106 to enable the vertical stud member 8 (at either of its first or second ends) to be connected to the horizontal stud member or head track 38' in a first orientation (in which the opening 34 of the vertical stud member 8 faces in a direction towards a first end of the horizontal stud member of head track 38') or in a second orientation (in which the opening 34 of the vertical stud member 8 faces in a direction towards a second end of the horizontal stud member of head track 38').

When a vertical stud member 8 is connected to a horizontal stud member or head track 38' using the stud connector 100 both horizontal movement (in a direction parallel to the axis of the horizontal stud member or head track 38') and vertical movement (in a direction parallel to the axis of the vertical stud member 8) of the vertical stud member 8 with respect to the horizontal stud member or head track 38' is permitted. In particular, the attachment portion 108 of the connector 100 is able to slide freely along the horizontal stud member or head track 38' in a direction parallel to the axis of the horizontal stud member or head track 38', such that horizontal movement of the vertical stud member 8 in this direction can be accommodated. Vertical movement of the vertical stud member 8 with respect to the horizontal stud member or head track 38' is accommodated by the sliding engagement of the vertical stud member 8 with the main body 106 of the connector 100.

The length of the tubular member 112 may be such that the connector 100 can accommodate a greater vertical displacement of the vertical stud member 8 than that expected due to external loadings. This means that the vertical stud member 8 does not have to be cut to length as accurately as in conventional, prior art systems. The stud connector 100 can therefore accommodate vertical movement of the vertical stud member 8 due to vertical external loads applied to the wall, as well as expansion of the vertical stud member 8 along its axis due to temperature changes, such as those experienced during a fire, for example. These thermal expansions can be significant, with a 2.4 m length stud member expanding up to 14 mm in a longitudinal direction.

The block element 102 of the stud connector 100 is preferably made from a suitable non-metallic material. The non-metallic material is preferably flame retardant and self extinguishing. Additionally the material will have sufficient rigidity and strength that the block element 102 of the connector 100 is rigid and has the necessary structural integrity. Preferably the non-metallic material comprises nylon (polyamide 6 or polyamide 66). In preferred embodiments the nylon is glass-reinforced for increased strength.

The material of the block element 102 of the connector 100 preferably not only assists in creating a smooth sliding motion both between the vertical stud member 8 and the tubular member 112 of the connector 100 and between the connector 100 and the horizontal stud member or head track 38', but also helps to isolate any sound transference through the stud frame of the wall. This increases the acoustic performance of the wall system and reduces the possibility of sound transference that would be undesirable or unacceptable to inhabitants or users of the building. It will be appreciated that, under normal conditions there is no contact between the plate element 104 and either the vertical stud member 8 or the horizontal stud member or head track 38'. The only contact is between the block element 102 and the vertical stud member 8 and between the block element 102 and the horizontal stud member or head track 38'.

It will be appreciated, however, that the melting point of the material from which the block element 102 is made is still likely to be appreciably less than the temperatures experienced by the stud frame wall in a fire. Temperatures of internal walls in a building can reach 550° C. to 600° C., while the melting point of a suitable polymer material such as polyamide 66 is about 265° C. It will be appreciated, therefore, that the structural properties of the block element 102 will be lost relatively quickly as the temperature of the stud frame rises in a fire. It has been estimated that the block element 102 will begin to melt after about 20 minutes in a fire.

Figure 17:
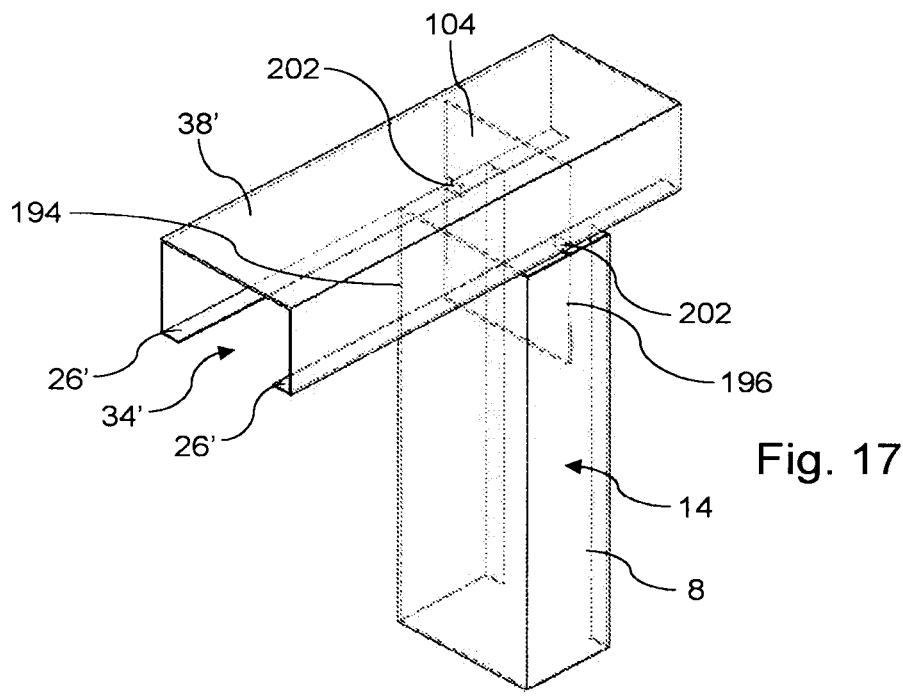
FIG. 17 is a perspective view of a plate element of the connector of FIG. 4 engaged with an end of a stud member and a head track.
Figure 18:
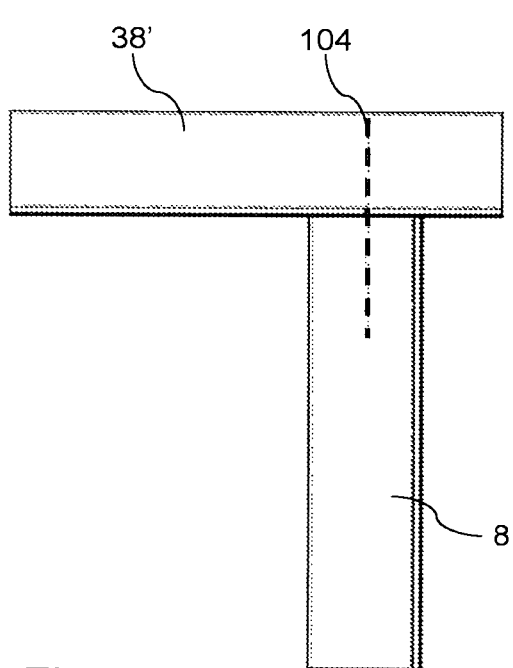
FIG. 18 is a plan view from a side of the plate element of FIG. 17 engaged with an end of a stud member and a head track.
Figure 19:
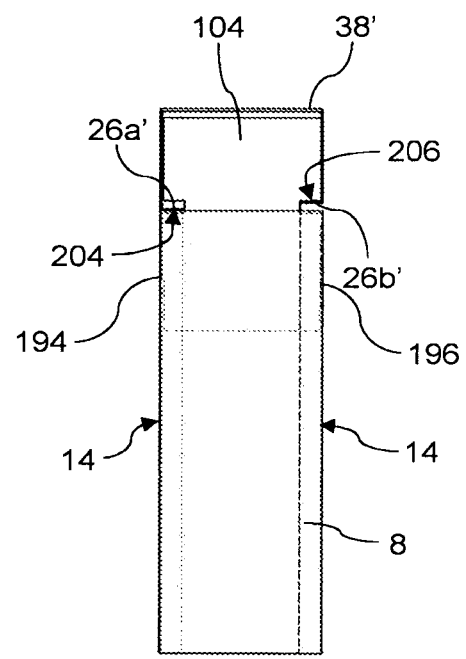
FIG. 19 is a plan view from an end of the plate element of FIG. 17 engaged with an end of a stud member and a head track.

In use, when the temperature reaches a level at which the block element 102 fails such that it can no longer support the load of the horizontal stud member or head track 38', this load is transferred to the plate element 204 of the connector 100. As shown in FIGS. 17 to 19, upon loss of the block element 102, the plate element 104 is exposed and maintains a structural and load bearing connection between the horizontal stud member or head track 38' and the vertical stud member 8.

The plate element 204 is made of a suitable metal, such as galvanised steel. The plate element 204 therefore preferably has a melting point in excess of 1300° C.

Under the increased temperatures of the fire, the vertical stud member 8 will increase in length due to thermal expansion. As described above, the plate element 104 is preferably tapered such that a distance between the first and second side edges 194, 196 at the first end edge 198 is slightly less than a distance between the first and second side edges 194, 196 at the second end edge 200. Accordingly, as thermal expansion of the stud member 8 occurs, the stud member 8 will increase in length and the end of the stud member 8 will move towards the second end edge 200 of the plate element 104. The wedge shape of the plate element 104 means that the side plates 14 of the stud member contact and apply a force to the first and second side edges 194, 196 of the plate element 104 that maintains the stud member 8 in position with respect to the plate element 104.

An upper region of the plate element 104 is held within the channel of the horizontal stud member or head track 38' due to contact between the lips 26' of the horizontal stud member or head track 38' and the first and second sides 204, 206 of the notches 202. In particular, a first lip 26a' will contact the second side 206 of a first one of the notches 202 and a second lip 26b' will contact the first side 204 of a second one of the notches 202. As the stud member 8 expands further, an upper end of the stud member 8 may contact and apply a force to the first lip 26a' of the horizontal stud member or head track 38'.

The plate element 104 therefore allows the connector 100 to maintain the structural integrity of the frame of the stud wall for longer in a fire situation than with the provision of the block element 102 alone.

Returning now to FIGS. 13 to 16, a stud connector 100 may also be used to connect the vertical stud member 8 to a base track 40'.

Similar to the arrangement described above in relation to the head track 38', a lower end of the stud member 8 is engaged with the main body portion 106 of a connector 100. The end portion of the stud member 8 slidingly engages with the tubular member 112 with the lip 26b extending from the second side wall 14b of the stud member 8 locating in the third slot 144 in the first side wall 120 of the tubular member 112. The lip 26a that extends from the first side wall 14a extends over an edge region of an outer surface of the fourth side wall 126 of the tubular member 112 proximate the second side wall 122.

To connect the vertical stud member 8 to the base track 40' the locking element 152 of the connector 100 is engaged with the base track 40'. In particular, the locking element 152 of the connector 100 is inserted through the opening 34' of the base track 40' with the connector 100 in a first orientation. In the first orientation the first and second side walls 156, 158 of the locking element 152 are preferably substantially parallel to first and second side walls 14' of the base track 40'. With the locking element 152 partially disposed within the channel of the base track 40' such that the lips 26' are aligned with the stem portion 176 of the locking element 152, the connector 100 is rotated to a second orientation with respect to the base track 40'. In the second orientation the first and second side walls 156, 158 of the locking element 152 are preferably substantially perpendicular to the first and second side walls 14' of the base track 40'. In preferred embodiments, therefore, the connector 100 is rotated through about 90° about its longitudinal axis 118 between the first and second orientations.

With the connector 100 in the second orientation a part of each of the first and second lips 26' of the base track 40' is disposed in a respective one of the first and second undercuts 168, 170. In this way, a part of the first lip 26a' is disposed between the first locking wing 172 and the base plate 150 of the attachment portion 108 of the connector 100 and a part of the second lip 26b' is disposed between the second locking wing 174 and the base plate 150 of the attachment portion 108 of the connector 100. The position of the plate element 104 relative to the block element 102 means that, with the connector 100 inserted into the base track 40' and in the second orientation, the lips 26' of the base track 40' are also disposed in the notches 202 of the plate element 104.

Figure 14:
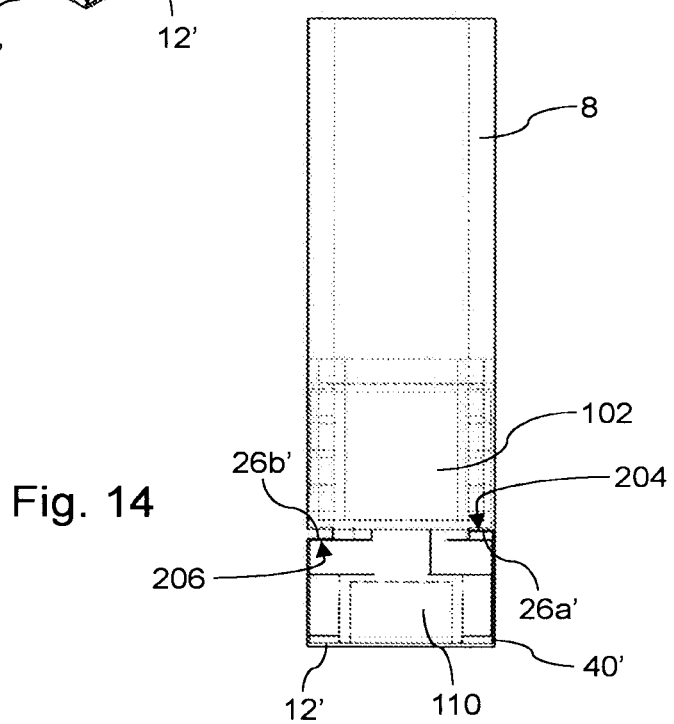
FIG. 14 is a plan view from an end of the connector of FIG. 4 engaged with an end of a stud member and a base track.
Figure 15:
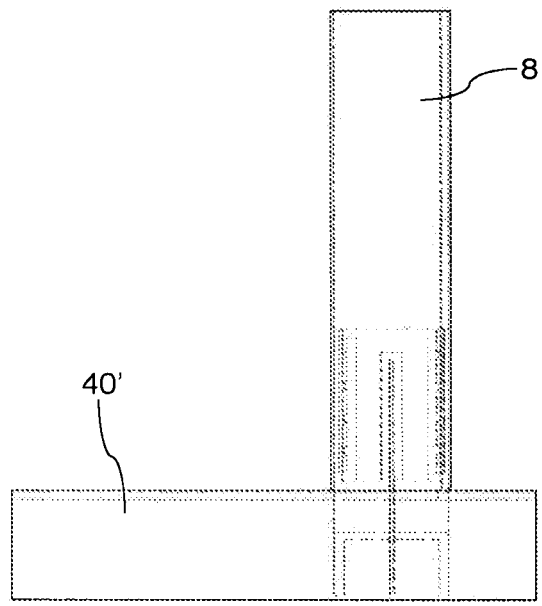
FIG. 15 is a plan view from a side of the connector of FIG. 4 engaged with an end of a stud member and a base track.
Figure 16:
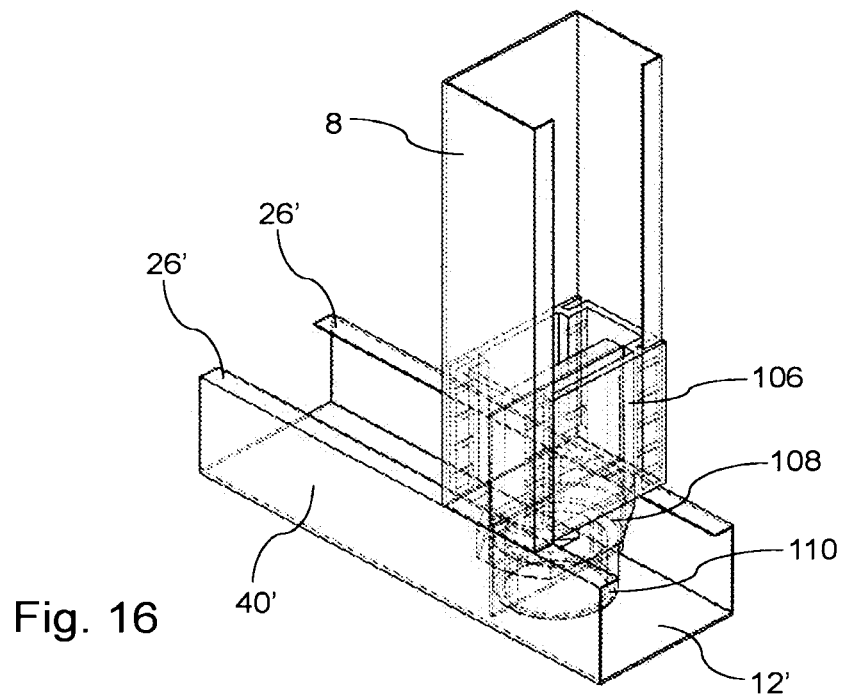
FIG. 16 is a further perspective view of the connector of FIG. 4 engaged with an end of a stud member and a base track.

The dimensions of the block element 102, and in particular the load bearing portion 110, are such that the second end 184 of the split tubular member 180 is in contact with an inner surface of the base plate 12', as shown in FIGS. 14 and 16. In this way, loads from the vertical stud member 8 will be transferred to the base plate 12' of the base track 40' through the block element 102 of the connector 100.

When a vertical stud member 8 is connected to a base track 40' using the stud connector 100 both horizontal movement (in a direction parallel to the axis of the base track 40') and vertical movement (in a direction parallel to the axis of the vertical stud member 8) of the vertical stud member 8 with respect to the base track 40' is permitted. In particular, the attachment portion 108 of the connector 100 is able to slide freely along the base track 40' in a direction parallel to the axis of the base track 40', such that horizontal movement of the vertical stud member 8 in this direction can be accommodated. Vertical movement of the vertical stud member 8 with respect to the base track 40' is accommodated by the sliding engagement of the vertical stud member 8 with the main body 106 of the connector 100.

The material of the block element 102 of the connector 100 preferably not only assists in creating a smooth sliding motion both between the vertical stud member 8 and the tubular member 112 of the connector 100 and between the connector 100 and base track 40', but also helps to isolate any sound transference through the stud frame of the wall. This increases the acoustic performance of the wall system and reduces the possibility of sound transference that would be undesirable or unacceptable to inhabitants or users of the building. It will be appreciated that, under normal conditions there is no contact between the plate element 104 and either the vertical stud member 8 or the base track 40'. The only contact is between the block element 102 and the vertical stud member 8 and between the block element 102 and the base track 40'.

As described above, in a fire, when the temperature of the frame of the stud wall rises, the structural properties of the block element 102 will be lost and eventually the plate element 104 will be exposed. The plate element 104 then maintains a structural and load bearing connection between the vertical stud member 8 and the base track 40'.

The side plates 14 of the stud member 8 contact and apply a force to the first and second side edges 194, 196 of the plate element 104 which maintains the stud member 8 in position with respect to the plate element 104. A lower region of the plate element 104 is held within the channel of the base track 40' due to contact between the lips 26' of the base track 40' and the first and second sides 204, 206 of the notches 202. In particular, a first lip 26a' will contact the first side 204 of a first one of the notches 202 and a second lip 26b' will contact the second side 206 of a second one of the notches 202. As the stud member 8 expands further, a lower end of the stud member 8 may contact and apply a force to the first lip 26a' of the base track 38'.

The stud connector 100 of the present invention therefore provides a connection between a vertical stud member and a horizontal stud member (or head track or base track) that, in normal circumstances, minimises or eliminates metal on metal contact between stud members, thereby minimising noise generation and isolating sound transference through the stud frame of the wall. Furthermore, the stud connector 100 maintains a structural and load bearing connection between a vertical stud member and a horizontal stud member (or head track or base track) even under the increased temperatures experienced in a fire, and therefore maintains the integrity of the stud wall.

Other modifications and variations not explicitly disclosed above may also be contemplated without departing from the scope of the invention as defined in the appended claims.

What is claimed is:

1. A connector for connecting two stud members in a stud wall, the connector comprising:
    a block element made from a polymeric material, the block element comprising:
    a main body portion inserted into an end of a first stud member, the main body portion comprising a first end, a second end, and four substantially orthogonal side walls, an engagement slot being provided in a first one of the side walls and the engagement slot extending in a direction towards an opposite second one of the side walls and extending parallel to a third one of the side walls;
    an attachment portion extending from the main body portion, the attachment portion including a pair of locking wings configured to engage with a second stud member such that, in use, a part of the second stud member is disposed in gaps between the locking wings and the main body portion; and
    a plate slot extending through a part of the attachment portion and through a part of the main body portion; and
    a plate element made from a metallic material, the plate element comprising first and second side edges and a notch in each of the first and second side edges, the plate element being disposed in the plate slot of the block element such that the notches of the plate element are aligned with the gaps in the block element.

2. A connector as claimed in claim 1 further comprising a second engagement slot provided in the second one of the side walls and the second engagement slot extending in a direction towards the opposite first one of the side walls and extending parallel to the third side wall.

3. A connector as claimed in claim 1, wherein the attachment portion extends from a first end of the main body portion, and the plate element is planar.

4. A connector as claimed in claim 1, wherein the plate slot extends through the locking wings.

5. A connector as claimed in claim 1, in which the attachment portion comprises a locking element including opposite first and second side walls, the first and second side walls being planar and the first side wall being disposed proximate and extending parallel to a third one of the side walls of the main body portion and the second side wall being disposed proximate and extending parallel to a fourth one of the side walls of the main body portion, and a part of the locking element forming the locking wings.

6. A connector as claimed in claim 1, wherein the block element further comprises a load bearing portion extending from the attachment portion, the load bearing portion being substantially tubular, and the plate slot extending through the load bearing portion.

7. A connector as claimed in claim 6, wherein the plate element does not protrude beyond an end of the load bearing portion.

8. A connector as claimed in claim 1, wherein the notches are disposed at a distance from a first end edge of the plate element, and the plate element is tapered such that a first distance between the first and second side edges of the plate element proximate the notches is greater than a second distance between the first and second side edges of the plate element at the first end edge.

9. An assembly comprising:
a first stud member comprising a first channel member having a base plate, a pair of side walls and a pair of lips extending from the side walls, an opening of the first channel member being defined between the lips;
a second stud member, comprising a second channel member having a base plate, a pair of side walls and a pair of lips extending from the side walls, an opening of the second channel member being defined between the lips; and
a connector as claimed in claim 1, one of the lips of the first stud member being partially disposed in the engagement slot or one of the engagement slots of the connector such that the main body portion of the connector is at least partially disposed in an end region of the first channel member, and the attachment portion of the connector being disposed in the second channel member such that a part of the lips of the second stud member are disposed in the gaps between the locking wings and the main body portion of the connector.

10. An assembly as claimed in claim 9, wherein the attachment portion extends from a first end of the main body portion, the plate element is planar, and a longitudinal axis of the first stud member is perpendicular to a longitudinal axis of the second stud member.

11. An assembly as claimed in claim 10, wherein the block element comprises a load bearing portion extending from the attachment portion, the load bearing portion being substantially tubular, and the plate slot extending through the load bearing portion, and an end of the load bearing portion is in contact with the base plate of the second channel member.

12. An assembly as claimed in claim 9, wherein a distance between the base plate and the lip of a first one of the side walls of the first channel member is greater than a distance between the base plate and the lip of a second one of the side walls of the first channel member, and wherein a distance between opposite third and fourth side walls of the main body portion of the connector is substantially equal to the distance between the base plate and the lip of the first one of the side walls of the first channel member, and wherein the lip of the second one of the side walls is partially disposed in the engagement slot or one of the engagement slots of the connector.

13. An assembly as claimed in claim 9, wherein a distance between the base plate and the lip of a first one of the side walls of the second channel member is greater than a distance between the base plate and the lip of a second one of the side walls of the second channel member, and wherein a width of each of the notches is substantially equal to the difference in the distances between the base plate and the lips of the first and second side walls of the second channel member.

14. A kit comprising:
a first stud member comprising a first channel member having a base plate, a pair of side walls and a pair of lips extending from the side walls, an opening of the first channel member being defined between the lips;
a second stud member, comprising a second channel member having a base plate, a pair of side walls and a pair of lips extending from the side walls, an opening of the second channel member being defined between the lips; and
a connector as claimed in claim 1.

15. A kit as claimed in claim 14, wherein the second stud member is a head track of a stud wall, and the kit further comprises a base track of a stud wall and a second connector.

16. A stud frame comprising:
a first elongate channel member comprising a pair of side walls and a pair of lips extending from the side walls, the first channel member extending between first and second ends;
a head track including a second elongate channel member comprising a pair of side walls and a pair of lips extending from the side walls, a longitudinal axis of the second channel member extending perpendicular to a longitudinal axis of the first channel member;
a base track including a third elongate channel member comprising a pair of side walls and a pair of lips extending from the side walls, a longitudinal axis of the third channel member extending perpendicular to the longitudinal axis of the first channel member and parallel to the longitudinal axis of the second channel member;
a first connector according to claim 1, the main body portion of the first connector being at least partially disposed in a first end region of the first channel member such that a part of one of the lips of the first channel member is received in the engagement slot or one of the engagement slots, and the attachment portion of the first connector being engaged with the second channel member; and
a second connector according to claim 1, the main body portion of the second connector being at least partially disposed in a second end region of the first channel member such that a part of one of the lips of the first channel member is received in the engagement slot or one of the engagement slots, and the attachment portion of the second connector being engaged with the third channel member.

17. A wall comprising a stud frame according to claim 16 and a layer of sheathing secured to the first channel member, wherein the sheathing is free to move with respect to the second channel member and the third channel member.

18. A method of constructing a stud frame comprising:
engaging a main body portion of a connector with an end region of a first elongate channel member by inserting a part of a lip of the first channel member in an engagement slot of the connector, the connector being according to claim 1;
inserting an attachment portion of the connector into a second elongate channel member with the locking wings of the connector in a first orientation with respect to the second channel member; and
moving the connector with respect to the second channel member such that the locking wings are in second orientation with respect to the second channel member and a part of the second channel member is disposed in gaps between the locking wings and the main body portion of the connector to secure the first channel member to the second channel member with a longitudinal axis of the first channel member extending perpendicular to a longitudinal axis of the second channel member.

19. A method as claimed in claim 18, wherein the step of moving the connector comprises rotating the connector through 90° about an axis of the connector.

20. A method as claimed in claim 18, further comprising:
engaging a main body portion of a second connector with a second end region of the first channel member by inserting a part of a lip of the first channel member in an engagement slot of the second connector;
inserting an attachment portion of the second connector into a third elongate channel member with the locking wings of the second connector in a first orientation with respect to the third channel member; and moving the second connector with respect to the third channel member such that the locking wings are in second orientation with respect to the third channel member and a part of the third channel member is disposed in gaps between the locking wings and the main body portion of the second connector to secure the first channel member to the third channel member with a longitudinal axis of the first channel member extending perpendicular to a longitudinal axis of the third channel member.

21. A connector for connecting two stud members in a stud wall, the connector comprising:

a block element made from a polymeric material, the block element comprising:

a main body portion configured for insertion into an end of a first stud member, the main body portion comprising a first end, a second end, and four substantially orthogonal side walls, an engagement slot being provided in a first one of the side walls and the engagement slot extending in a direction towards an opposite second one of the side walls and extending parallel to a third one of the side walls;

an attachment portion extending from the main body portion, the attachment portion including a pair of locking wings configured to engage with a second stud member such that, in use, a part of the second stud member is disposed in gaps between the locking wings and the main body portion; and a plate slot extending through a part of the attachment portion and through a part of the main body portion;

a plate element made from a metallic material, the plate element comprising first and second side edges and a notch in each of the first and second side edges, the plate element being disposed in the plate slot of the block element such that the notches of the plate element are aligned with the gaps in the block element; the connector further comprising a second engagement slot provided in the second one of the side walls and the second engagement slot extending in a direction towards the opposite first one of the side walls and extending parallel to the third side wall.

* * * * *